(12) United States Patent
Yang et al.

(10) Patent No.: US 8,274,943 B2
(45) Date of Patent: Sep. 25, 2012

(54) MIMO OFDMA WITH ANTENNA SELECTION AND SUBBAND HANDOFF

(75) Inventors: Hong-Kui Yang, San Diego, CA (US); Shu Wang, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 423 days.

(21) Appl. No.: 12/730,426

(22) Filed: Mar. 24, 2010

(65) Prior Publication Data

US 2010/0246489 A1  Sep. 30, 2010

Related U.S. Application Data

(60) Provisional application No. 61/162,682, filed on Mar. 24, 2009.

(51) Int. Cl.
*H04W 4/00* (2009.01)
*H04J 3/16* (2006.01)

(52) U.S. Cl. .......................................... 370/329; 370/468

(58) Field of Classification Search ................. None
See application file for complete search history.

(56) References Cited

U.S. PATENT DOCUMENTS

| | | | | |
|---|---|---|---|---|
| 7,647,073 | B2 * | 1/2010 | Sung et al. | 455/562.1 |
| 2010/0214985 | A1 * | 8/2010 | Chun et al. | 370/328 |

\* cited by examiner

*Primary Examiner* — Clemence Han
(74) *Attorney, Agent, or Firm* — Richard K. Huffman; James W. Huffman

(57) ABSTRACT

An access node wirelessly coupled to a plurality of access terminals, having a subband scheduler, a plurality of orthogonal frequency division multiplex elements, and a plurality of antennas. The subband scheduler receives precoded data, and schedules transmission of a preamble signal and a plurality of data streams. The plurality of orthogonal frequency division multiplex elements converts the preamble signal and the plurality of data streams into a corresponding preamble tone and a corresponding plurality of data tones. The preamble tone indicates a mapping of the plurality of data tones to one or more of the plurality of access terminals. The plurality of antennas transmits the corresponding preamble tone and the corresponding plurality of data tones in timely fashion for receipt by the plurality of access terminals. The corresponding preamble tone and the corresponding data tones are transmitted over subbands of a code division multiple access (CDMA)-based carrier frequency.

19 Claims, 15 Drawing Sheets

FORWARD TRAFFIC CHANNEL SINGLE USER SIMPLEX MAC LAYER PACKET

FORWARD TRAFFIC CHANNEL SINGLE USER MULTIPLEX MAC LAYER PACKET

LAYER BASED OFDMA PREAMBLE STRUCTURE

ADAPTIVE PREAMBLE FORMAT STRUCTURE

TAIL-BITING CONVOLUTIONAL CODING

OFDMA SLOT STRUCTURE

FIG. 11

SECTORPARAMETER MESSAGE

1100

| FIELD | LENGTH (BITS) |
|---|---|
| MESSAGEID | 8 |
| COUNTRYCODE | 12 |
| SECTORID | 128 |
| SUBNETMASK | 8 |
| SECTORSIGNATURE | 16 |
| LATITUDE | 22 |
| LONGITUDE | 28 |
| ROUTEUPDATERADIUSOVERHEAD | 11 |
| LEAPSECONDS | 8 |
| LOCALTIMEOFFSET | 11 |
| REVERSELINKSILENCEDURATION | 2 |
| REVERSELINKSILENCEPERIOD | 2 |
| CHANNELCOUNT | 5 |
| CHANNELCOUNT OCCURRENCES OF THE FOLLOWING FIELD: | |
| CHANNEL | 24 |
| NEIGHBORCOUNT | 5 |
| NEIGHBORCOUNT OCCURRENCES OF THE FOLLOWING FIELD: | |
| NEIGHBORPILOT PN | 9 |
| NEIGHBORCOUNT OCCURRENCES OF THE FOLLOWING 2 FIELDS: | |
| NEIGHBORCHANNELINCLUDED | 1 |
| NEIGHBORCHANNEL | 0 OR 24 |
| NEIGHBORSEARCHWINDOWSIZEINCLUDED | 1 |
| NEIGHBORCOUNT OCCURRENCES OF THE FOLLOWING FIELD: | |
| NEIGHBORSEARCHWINDOWSIZE | 0 OR 4 |
| NEIGHBORSRCHWINDOWOFFSETINCLUDED | 1 |
| NEIGHBORCOUNT OCCURRENCES OF THE FOLLOWING FIELD: | |
| NEIGHBORSEARCHWINDOWOFFSET | 0 OR 3 |
| EXTENDEDCHANNELINCLUDED | 0 OR 1 |

| FIELD | LENGTH (BITS) |
|---|---|
| EXTENDEDCHANNELCOUNT | 0 OR 5 |
| 0 OR EXTENDEDCHANNELCOUNT OCCURRENCES OF THE FOLLOWING FIELD: | |
| EXTENDEDCHANNEL | 24 |
| ACCESSHASHINGCHANNELMASKINCLUDED | 0 OR 1 |
| ACCESSHASHINGMASKLENGTH | 0 OR 4 |
| N OCCURRENCES OF THE FOLLOWING RECORD, WHERE 0 ≤ N ≤ (CHANNELCOUNT + EXTENDEDCHANNELCOUNT): | |
| ACCESSHASHINGCHANNELMASKSAMEASPREVIOUS | 1 |
| ACCESSHASHINGCHANNELMASKSAMEASPREVIOUS | 0 OR ACCESSHASHINGMASKLENGTH + 1 |
| ROUTEUPDATETRIGGERINCLUDED | 0 OR 1 |
| ROUTEUPDATETRIGGERCODE | 0 OR 12 |
| ROUTEUPDATETRIGGERMAXAGE | 0 OR 4 |
| PRIOR SESSIONGAUP | 0 OR 1 |
| FPDCHSUPPORTINCLUDED | 0 OR 1 |
| M, 0 ≤ M ≤ NEIGHBORCOUNT OCCURRENCES OF THE FOLLOWING FIELD: | |
| FPDCHSUPPORTED | 0 OR 1 |
| SECONDARYCOLORCODEINCLUDED | 0 OR 1 |
| SECONDDARYCOLORCODECOUNT | 0 OR 8 |
| 0 OR SECONDARYCOLORCODECOUNT OCCURRENCES OF THE FOLLOWING FIELD: | |
| SECONDARYCOLORCODE | 8 |
| RESERVED | 0-7 (AS NEEDED) |

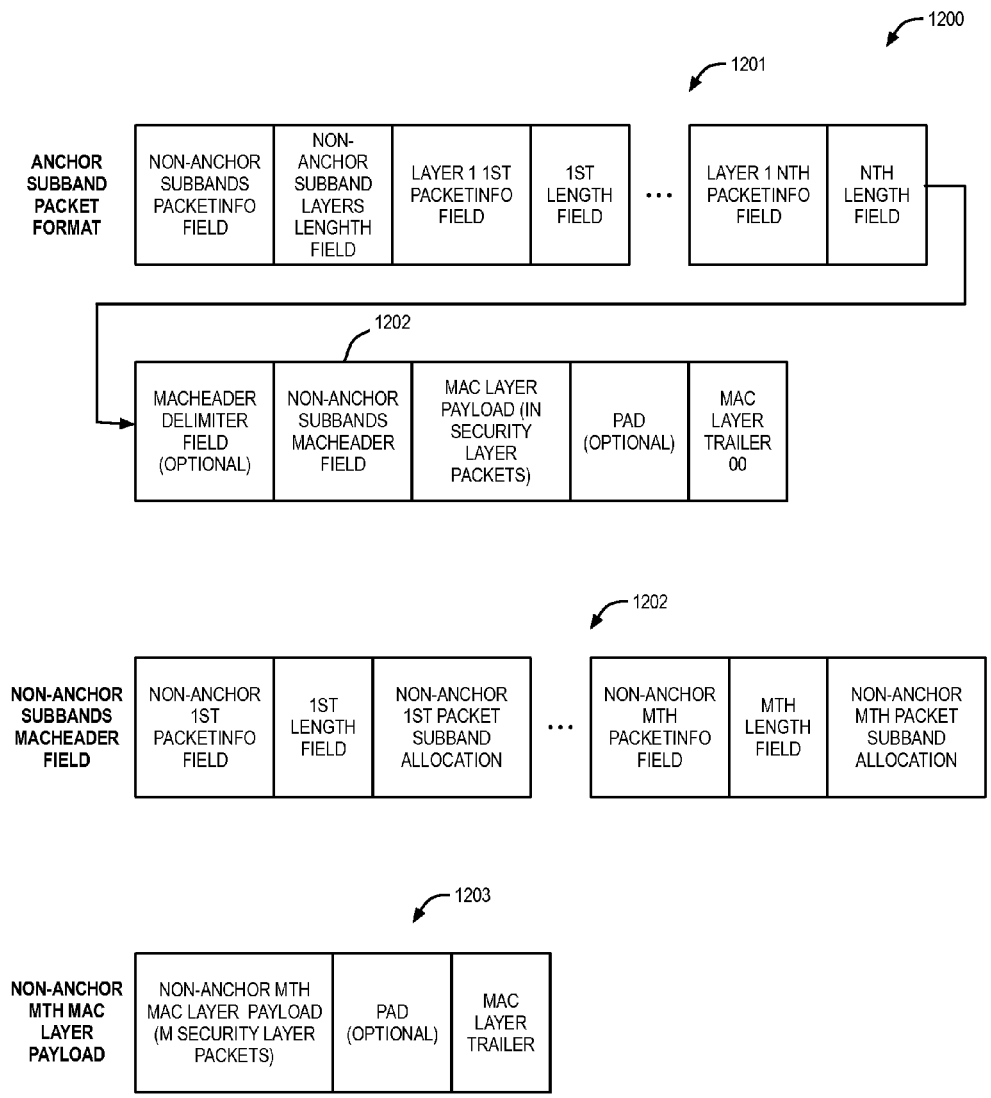

FIG. 15

MODIFIED ROUTEUPDATE MESSAGE

1500

| FIELD | LENGTH (BITS) |
|---|---|
| MESSAGEID | 8 |
| MESSAGESEQUENCE | 8 |
| REFERENCEPILOTPH | 9 |
| REFERENCEPILOTSTRENGTH | 6 |
| REFERENCEKEEP | 1 |
| NUMPILOTS | 4 |

NUMPILOTS OCCURRENCES OF THE FOLLOWING FIELDS:

| PILOTPHPHASE | 15 |
|---|---|
| CHANNELINCLUDED | 1 |
| CHANNEL | 0 OR 24 |
| PILOTSTRENGTH | 6 |
| KEEP | 1 |
| SUBBANDC2ISTRENGTHORDER | TBD |

| RESERVED | VARIABLE |
|---|---|

MIMO OFDMA WITH ANTENNA SELECTION

SUBBAND MIMO-OFDMA

DEPLOYMENT OF OFDMA AND OFDM

MIMO OFDMA WITH ANTENNA SELECTION AND SUBBAND HANDOFF

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
| --- | --- | --- |
| 61/162,682 (VTU.09-0027-US) | Mar. 24, 2009 | MIMO OFDMA WITH ANTENNA SELECTION AND SUBBAND HANDOFF |

BACKGROUND OF THE INVENTION

1. Field of the Invention

This invention relates in general to the field of microelectronics, and more particularly to an apparatus and method for improving the data throughput over a cellular network.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service.

And although wireless cellular network technologies have continued to provide improvements related to the ability to process voice calls, there has also been an enormous pull on the industry to provide improvements related to the processing of data as well as voice. It is not uncommon today to find many cell phone users who not only place voice calls over a cellular network, but who also check their email, send text messages, and browse the internet.

Accordingly, a number of technologies are under development to improve the quality and throughput of data. These so-called "3G" or third generation cellular communications technologies are highly optimized for the reliable transfer of packet data instead of voice data. Hence, 3G data protocols such as EDGE® and EV-DO technologies are not generally characterized modulation techniques, but more so by performance metrics (e.g., 5 Megabits per second throughput). And this is because although a given data connection must be guaranteed some minimal level of latency and throughput, the timing required to transfer data such as a text message pales in comparison to that required to transfer voice information.

The above noted technologies for increasing throughput notwithstanding, the demands for data transfer continue to grow with cell phones now being used to transfer real time data related to audio and video files. Consequently, network providers are looking for ways to leverage existing infrastructures while at the same time providing for orders of magnitude in increases in data throughput and user capacity.

Consequently, the present inventors have noted the inefficiencies associated with the utilization of code division multiple access (CDMA) based data networks such as EDGE® and EV-DO® to process both non-real time data and delay sensitive data such as voice over internet protocol (VoIP) data, as well as other types of data.

Accordingly, what is needed is a technique that enables a CDMA-base cellular data network to process increasing amounts of data while at the same time maximizing the use of existing infrastructure.

In addition, what is needed is an apparatus and method for increasing the capacity of an existing CDMA-based data protocol in order to maximize the data transfer rate.

What is also needed is a mechanism for processing packetized data over a cellular data network that takes advantage of the unused bandwidth of an existing data network, but which also is compatible with legacy cellular devices.

SUMMARY OF THE INVENTION

The present invention, among other applications, is directed to solving the above-noted problems and addresses other problems, disadvantages, and limitations of the prior art.

The present invention provides a superior technique for improving the performance of a cellular packetized data network. In one embodiment, an access node wirelessly coupled to a plurality of access terminals is provided. The access node has a encoder, a plurality of multiplexer, and a transmitter. The encoder configured to generate a preamble signal corresponding with a plurality of data stream. The plurality of multiplexers, coupled to said encoder and configured to convert said preamble signal and said plurality of data streams into a corresponding preamble tone and a corresponding plurality of subbands, wherein the preamble tone indicates the configuration of the plurality of subbands, and the plurality of subbands comprising a plurality of data packets corresponding with the plurality of access terminals; and the transmitter, coupled to said plurality of multiplexers, configured to transmit said corresponding preamble tone and said corresponding plurality of subbands to the plurality of access terminals.

One aspect of the present invention contemplates a method for an access node wirelessly coupled to a plurality of access terminals. The method includes generating the preamble signal corresponding with a plurality of data stream; converting said preamble signal and said plurality of data streams into a corresponding preamble tone and a corresponding plurality of subbands, wherein the preamble tone indicates the configuration of the plurality of subbands, and the plurality of subbands comprising a plurality of data packets corresponding with the plurality of access terminals; and transmitting said corresponding preamble tone and said corresponding plurality of subbands to the plurality of access terminals.

Another aspect of the present invention comprehends an access terminal wirelessly coupled to one or more access nodes. The access terminal includes a plurality of antennas, a preamble detection element, and a multiplex equalization and demodulation element. The plurality of antennas, configured to receive a preamble tone and a plurality of data tones which have been transmitted over a plurality of subbands of a code division multiple access carrier frequency; The preamble detection element, operatively coupled to said plurality of antennas, configured to determine from said plurality of subbands according to said preamble tone, wherein said plurality of subbands comprise one or more corresponding data streams for reception by the access terminal; and the multiplex equalization and demodulation element, coupled to said preamble detection element, configured to convert said one or more of said plurality of subbands into said one or more corresponding data streams.

BRIEF DESCRIPTION OF THE DRAWINGS

These and other objects, features, and advantages of the present invention will become better understood with regard to the following description, and accompanying drawings where:

FIG. 11 is a diagram illustrating a SectorParameter message according to the present invention;

FIG. 12 is a diagram showing a format according to the present invention of a forward traffic channel multi-user MAC layer packet for the anchor subband;

FIG. 15 is a diagram showing a modified routeupdate message according to the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on cellular communications systems and associated techniques employed within present day wireless communications systems for the reliable transmission and reception of packetized data, a discussion of the limitations of present day mechanisms will now be discussed with reference to FIGS. 1-3. Following this, a discussion of the present invention will be presented with reference to FIGS. 4-19. The present invention overcomes the disadvantages of present day systems by providing apparatus and methods that employ both frequency diversity and spatial diversity in order to increase capacity and minimize interference.

Figure 1:
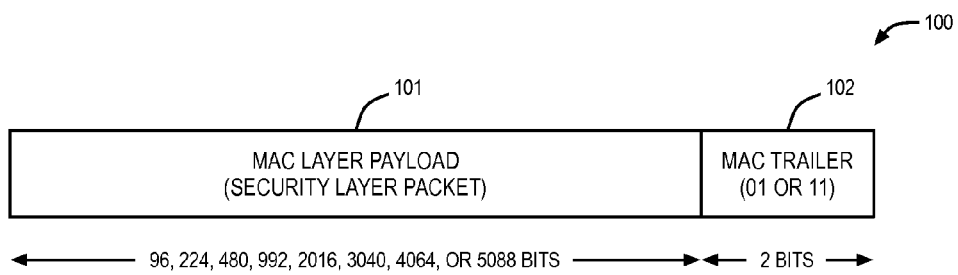
FIG. 1 is a block diagram illustrating a present day single user simplex media access control (MAC) layer packet.

Turning to FIG. 1, a block diagram is presented illustrating a present day single user simplex media access control (MAC) layer packet 100 for use in a wireless data communications protocol such as EDGE® or EV-DO®. The packet 100 is employed to send data from a single access node (AN) to a single access terminal (AT) over a CDMA-based forward traffic channel. The packet 100 is employed to transmit a single security layer payload 101. An AN is also known by those skilled in the art under some protocols as a base station. In addition, an AT is also known under some protocols as a mobile station, or cell phone. The present inventors note that although concepts associated with EDGE and EV-DO are discussed herein, such use of these concepts is presented for clarity sake in order to teach aspects of the present invention in a context that is familiar to the reader, however, the present invention contemplates protocols other than those presented as well. The packet 100 includes a payload field 101 that is coupled to a MAC trailer 102. The size of the payload 101 may be 96, 224, 480, 992, 2016, 3040, 4064, or 5088 bits.

Figure 2:
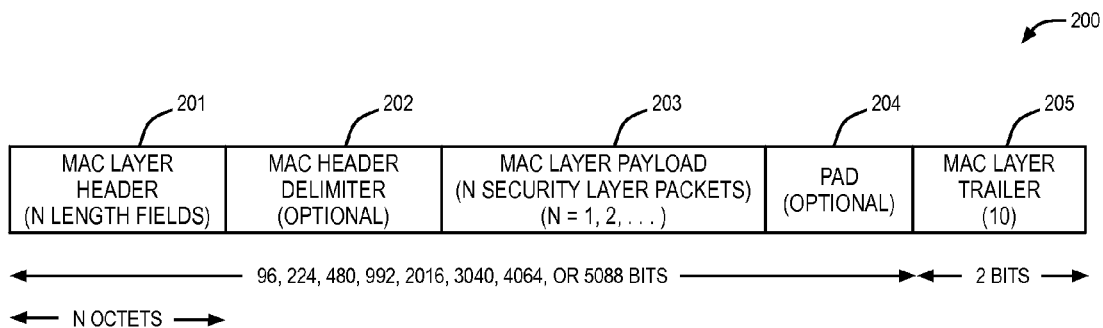
FIG. 2 is a block diagram depicting a present day single user multiplex MAC layer packet.

Referring now to FIG. 2, a block diagram is presented depicting a present day single user multiplex MAC layer packet 200 for use in a wireless data communications protocol. The packet 200 is employed to send data from a single AN to a single AT over a CDMA-based forward traffic channel. The packet 200 is employed to transmit one or more security layer payloads 203 from the AN to the AT. The packet 200 has a MAC layer header 201 that includes N length fields. The packet 200 also has a MAC header delimiter 202, which is optional. The packet 200 further includes a MAC layer payload 203 that has N security layer payloads designated for the target AT. The packet 200 provides for an optional pad field 204 along with a MAC trailer 205 that designates the packet 200 as a single user multiplex MAC layer packet 200.

Figure 3:
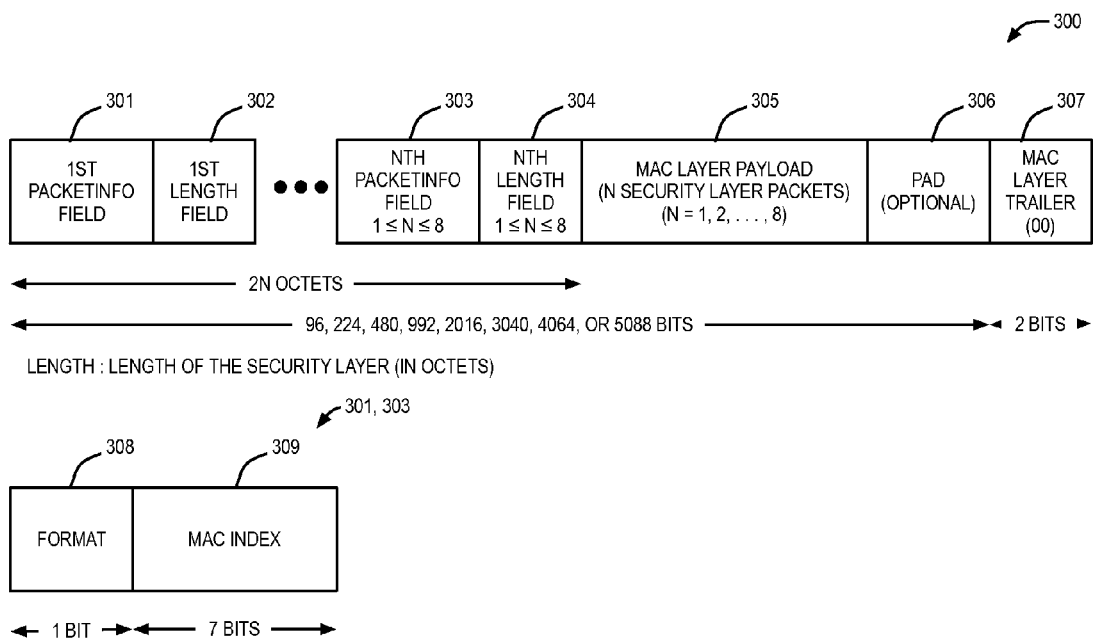
FIG. 3 is a block diagram featuring a present day multi-user MAC layer packet.

Turning now to FIG. 3, a block diagram is presented featuring a present day multi-user MAC layer packet 300 for use in a wireless data communications protocol. The packet 300 is employed to send data from a single AN to one or more ATs over a CDMA-based forward traffic channel. The packet 300 is employed to transmit one or more security layer payloads 305 from the AN to the Ats. The packet 300 can be employed to transmit data (i.e., security payloads) to a maximum of eight ATs, which are included in a MAC layer payload 305. Designation of the location of corresponding data within the MAC layer payload 305 for a particular AT is provided for by up to eight combinations of a packetinfo field 301, 303 coupled to a corresponding length field 302, 304. The packetinfo field 301, 303 includes a format field 308 and a MAC index field 309 that designate a specific AT and the length field 302, 304 specifies the specific data within the MAC layer payload 305 that is targeted for the specific AT. The packet 200 provides for an optional pad field 306 along with a MAC trailer 307 that designates the packet 300 as a multi-user multiplex MAC layer packet.

As one skilled in the art will appreciate, the various forms of MAC layer packets 100, 200, 300 as discussed with reference to FIGS. 1-3 represent the extent of the capabilities of a present day CDMA-based wireless communications system for transmission of packetized data. Although it is well-known that protocols employing these packet types 100, 200, 300 are well suited for transmitting data over wireless CDMA-based networks, the present inventors have observed that use of these types are limited due to real-world conditions, the most prevalent being interference (e.g., noise). In other words, inter- and intra-cell interference drives down the amount of data that can be transmitted, and as such, it is a desire within the art increase performance, particularly in view of increased use of data protocols for transmission of voice over internet protocol (VoIP).

There are a number of interference control (IC) techniques that are presently employed to reduce the sources and frequencies of interference, however, as one skilled in the art will appreciate, implementation of these techniques into devices that can be produced in a reliable and cost-effective manner is quite challenging at best and only provide for marginal gains in capacity. For example, the performance of one such technique, linear interference control, actually is known to degrade performance in an overloaded CDMA environment, such as is commonly experiences in one of the several "DO" network configurations which are presently employed. It is also appreciated that another interference control technique, nonlinear IC, is so complex in implementation that its use is predominately precluded for use in present day devices.

Consequently, the present inventors have noted that alternative mechanisms are required on top of the use of CDMA-base protocols in order to achieve real and meaningful increases in data throughput in the presence of common sources of interference. Accordingly, these techniques will now be discussed with reference to FIGS. 4-19. The present invention utilizes orthogonal frequency division multiplex (OFDM) mechanisms over the existing CDMA-based protocols to increase data throughput and capacity. In addition, the present invention contemplates the use of so called multiple-input/multiple-output (MIMO) technologies to provide for decreases in interference sources, better coverage, and increases in throughput as well. The present inventors have observed that the employment of OFDM with multiple antennas (OFDMA) can bring additional dimensions in optimizing existing DO networks. In addition, the techniques discussed herein according to the present invention provide for complete backward compatibility with existing legacy ATs. But for ATs according to the present invention, use of OFDMA as discussed herein will significantly improve the performance and operating efficiency of the existing DO infrastructure and devices through incremental low cost upgrades, thus providing for both higher spectral efficiency and extended network coverage.

In one aspect, an OFDMA multiuser packet is contemplated according to the present invention, which provides for backward compatibility with devices employing existing MAC layer packets 100, 200, 300, as discussed above. As one skilled in the art will appreciate, existing DO protocols utilize a 1.2288 MHz carrier. The present invention envisions dividing up the existing carrier into four subbands, each comprising a 0.3096 MHz subcarrier. To accomplish this end, a new field is defined and added into existing systems public data so that when an AT enters into the cell or sector of an AN according to the present invention, the AT will know how many subbands are configured for the particular AN.

In another aspect, one or multiple users (i.e., ATs) may be scheduled by the AN to share one or more of the subbands. In addition, one or more of the subbands may be occupied by a single user. It is noted that the terms "AT," "user," and "mobile station" are used interchangeably to connote a mobile device according to the present invention for transmission of data over a CDMA-based wireless network.

The present invention includes a new OFDMA preamble structure for use in a MAC layer packet according to the present invention. The packet employs tail-biting convolutional coding to convey a MAC index along with a rate indicator within each of the subbands.

Accordingly, the present invention contemplates a new SectorParameter message format that includes a subband mask and an anchor subband indicator to take advantage of OFDMA mechanisms. The subband mask includes a ChannelSubband mask, a NeighborSubband mask, and an ExtendedChannelSubband mask. The SectorParameter message will be discussed below with reference to FIG. 11.

In addition to the new SectorParameter message, a new RouteUpdate message format is presented to allow an AT according to the present invention to report carrier-to-interference (C/I) noise ratio to an AN via several methods. The RouteUpdate message will be specifically discussed with reference to FIG. 15 and includes a 4-bit field, PreferredSubband, via which and AT can indicate which subband combination has higher pilot strength density than the average pilot strength density. The RouteUpdate message also includes a 5-bit field, SubbandC2IStrengthOrder, via which an AT can indicate the C/I distribution across the subbands that are supported by the AN.

The present invention further provides for active set management at the subband level. Accordingly, when an AT according to the present invention reports an update of its active set, it also reports the C/I ratio information for each AN in its active set. In one embodiment, the AT reports the C/I order of the total subbands of the ANs in its active set. In an alternative embodiment, the AT reports the C/I order of the four subbands of each AN in its active set.

In other aspects, the present invention provides for per subband MIMO feedback with antenna selection and VoIP capacity improvements. The VoIP capacity improvements are affected via features for C/I sensitive digital rate control (DRC) reporting and subband hopping.

Because DO is known to be interference limited, the present inventors note that the employment of OFDMA techniques according to the present invention provide for new dimensions for optimizing a DO network which include multiplexing of data streams in the frequency domain and subband inter-cell interference management.

Through the application of multiuser multiple-input/single-output (MISO) DO techniques according to the invention disclosed herein, pilot and feedback overhead is reduced, and spatial diversity continues to be achievable through the employment of open-loop MIMO mechanisms.

Via OFDMA, the present invention supports fast subband handoff that requires no additional monitoring on other carriers. It is noted that this concept will help alleviate the ping-pong problem which is often noted during handoffs.

Various embodiments of ATs are contemplated according to the present invention to balance power consumption, mechanical limitations due to multiple existing radio interfaces (e.g., GPS, Bluetooth, WiFi), requirements for antenna spacing, and operating frequency bands. Regarding antenna spacing, it is recommended that to optimize spatial diversity gain, antenna separation should be greater than ½ wavelength which is approximately 15 centimeters at 2 GHz. Accordingly, the present invention envisions an AT comprising one receive antenna, another AT comprising two receive antennas, and a yet another AT comprising four receive antennas.

Figure 4:
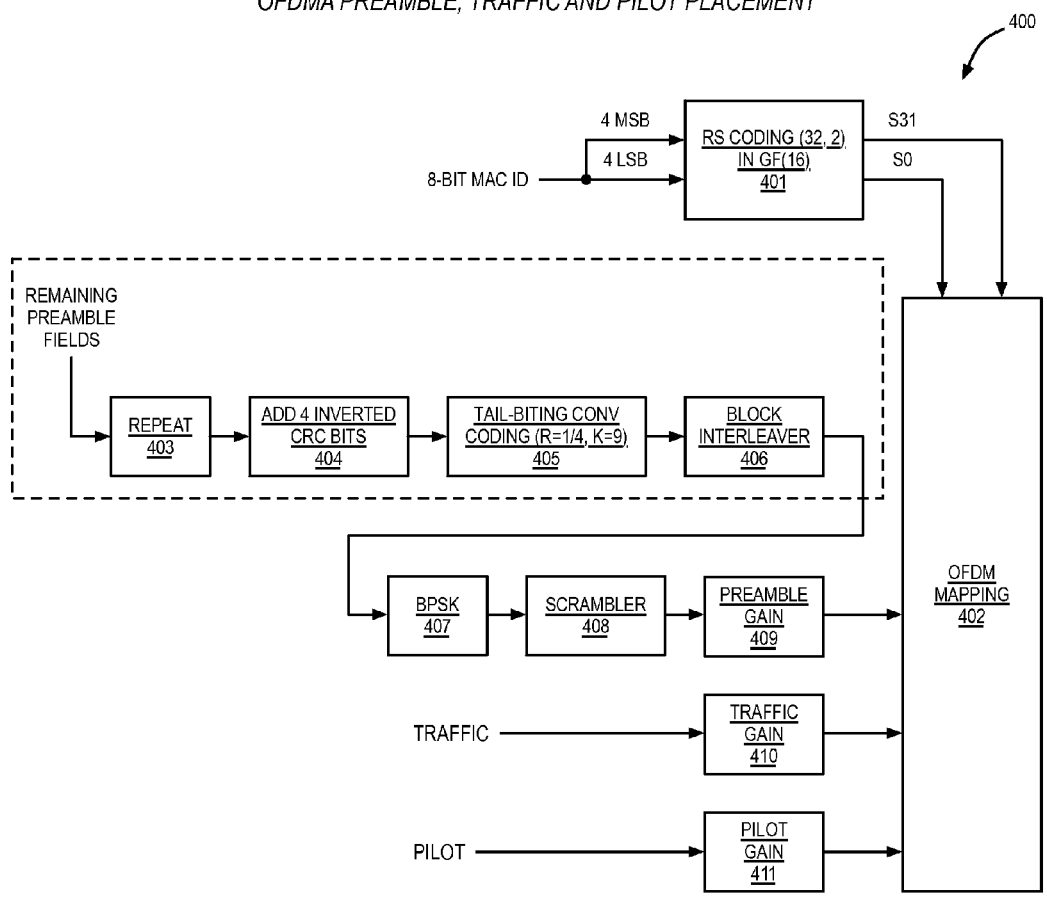
FIG. 4 is a block diagram showing apparatus in an AN according to the present invention for placement of a coded OFDMA preamble.

Referring now to FIG. 4, a block diagram 400 is presented depicting apparatus in an AN according to the present invention for placement of a coded OFDMA preamble. The block diagram 400 shows a Reed-Solomon encoder 401 which receives an 8-bit MAC ID designating an AT according to the present invention. The encoder 401 is coupled to an OFDM mapping element 402. Remaining preamble fields are input to a repeat element 403, which is coupled to an adder 404 that adds four inverted CRC bits to the output of the repeater 403. The output of the adder 404 is provided to a tail-biting convolutional coder 405 having R of ¼ and K equal to 9, although other embodiments are contemplated. Output of the coder 405 is provided to a block interleaver 406, whose output is received by a binary phase shift keying (BPSK) element 407. Output of the BPSK element 407 is input to a scrambler 408, whose output is input to a preamble gain element 409.

Traffic data is provided to a traffic gain element 410 and pilot data is input to a pilot gain element 411. Along with the output of the encoder 401, outputs from the preamble gain element 409, traffic gain element 410, and pilot gain element 411 are provided to the OFDM mapping element 402. These outputs are mapped onto OFDM tones, as will be described in more detail below.

One embodiment of the present invention considers transmission of a coded OFDMA preamble in an anchor subband always. The anchor subband is defined for each AN and its positioning is defined via transmission of the SectorParameter message. Thus, every AT that is served by a particular AN will always attempt to decode the designated anchor subband to find preamble information. The preamble information includes, but is not limited to: MAC index, indicating which AT is served in the current slot; forward link rate indicator, indicating the modulation/coding rate for each packet or AT; and optional subband allocation or structure information.

An alternative embodiment of the present invention comprehends an OFDMA preamble which is coded and modulated, and which is then OFDMA-mixed with OFDMA pilots and OFDMA traffic. FIG. 4 illustrates coding and modulation of this alternative preamble and, as is shown, positioning of the OFDMA preamble subcarriers is determined by the MAC index of the served AT. Thus, only the served AT is able to properly find, demodulate, and decode its intended OFDMA preamble.

Figure 5:
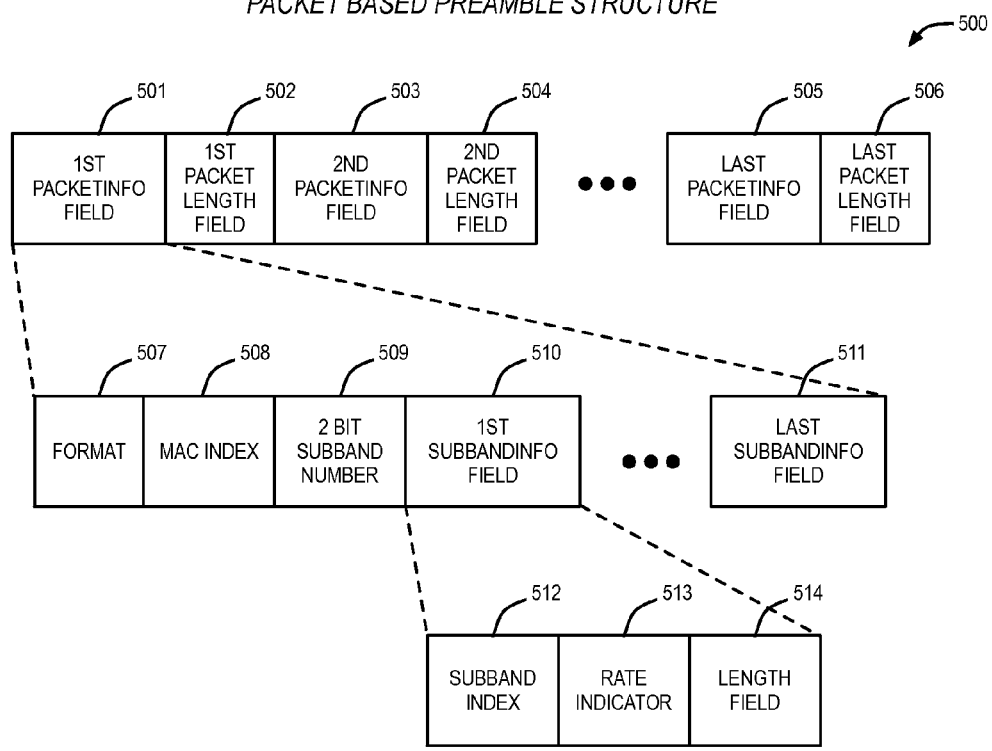
FIG. 5 is a block diagram illustrating a packet based preamble structure according to the present invention.

Now turning to FIG. 5, a block diagram is presented illustrating a packet based preamble structure 500 according to the present invention. The structure 500 includes a plurality of packetinfo fields 501, 503, 505, each concatenated to a corresponding each of a plurality of packet length fields 502, 504, 506. In one embodiment, the number of these pluralities ranges from one to eight, substantially similar to the preamble discussed with reference to FIG. 3. However, composition of the preamble 500 according to the present invention envisions a packetinfo field 501, 503, 505 that has a format field 507, a MAC index field 508, a 2-bit subband number field 509, a plurality of subband fields 510, 511, where subbands for the AT are designated by the plurality of subband fields 510, 511. Each of the plurality of subband fields 510, 511 has a subband index field 512 designating the subband, designating one of a plurality of OFDM subbands, a corresponding rate indicator field 513, and an associated length field 514. Accordingly, OFDMA techniques according to the present invention are employed to increase capacity in the presence of interference in a DO system via this packet based preamble structure 500.

Figure 6:
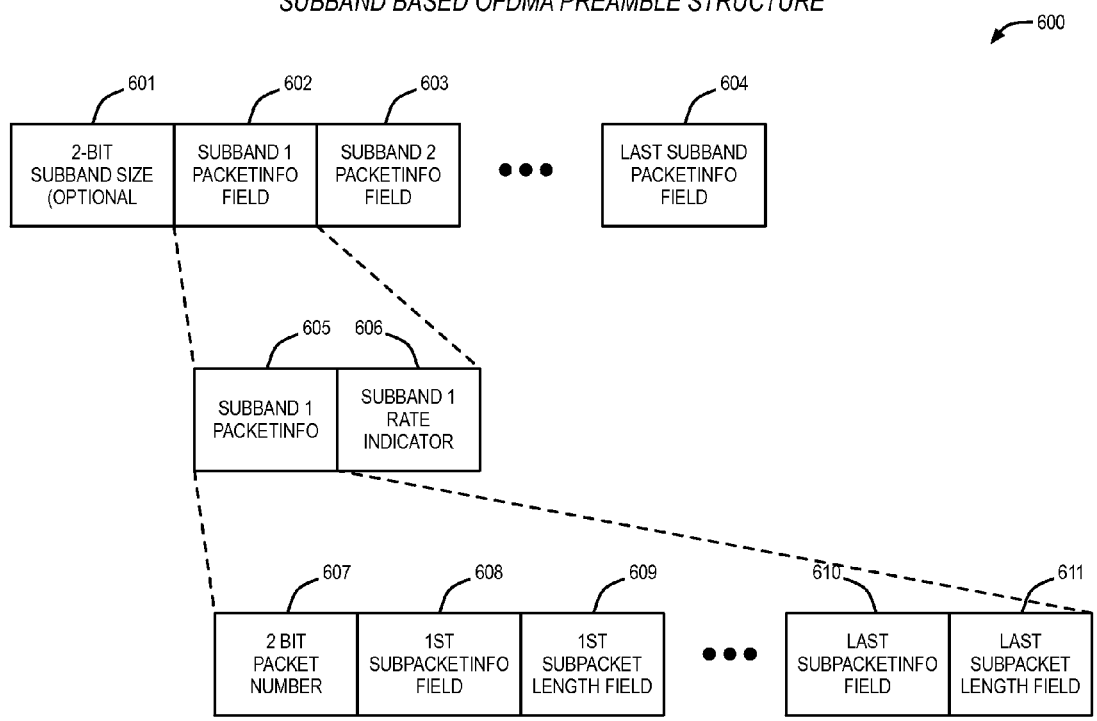
FIG. 6 is a block diagram detailing a subband based preamble structure according to the present invention.

Alternatively, FIG. 6 is a block diagram highlighting a subband based OFDMA preamble 600. The preamble 600 includes an optional 2-bit subband size field 601 along with one or more subband packetinfo fields 602, 603, 604. Each of the subband packetinfo fields 602, 603, 604 comprises a packetinfo field 605 and a rate indictor field 606. Each of the packetinfo fields 605 includes a 2 bit packet number 607, along with pairs of subpacketinfo fields 608, 610 and corresponding subpacket length fields 609, 611. Hence, OFDMA techniques according to the present invention are employed to increase capacity in the presence of interference in a DO system via this subband based preamble structure 600.

Figure 7:
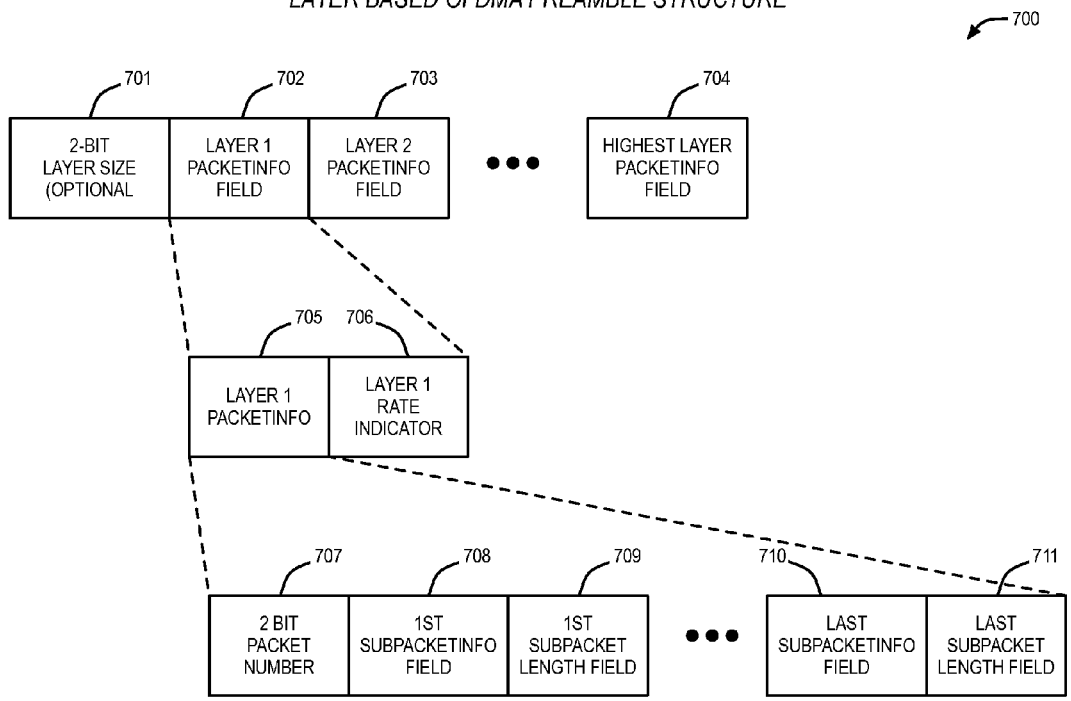
FIG. 7 is a block diagram illustrating a layer based OFDMA preamble structure according to the present invention.

Yet another embodiment of a preamble according to the present invention is shown in FIG. 7, which depicts a layer based OFDMA preamble structure 700. The preamble 700 has an optional 2-bit layer size 701. The preamble also has a plurality of layer packetinfo fields 702, 703, 704, each of which includes packetinfo 705 and a rate indicator 706 for the respective layer. Each packetinfo 705 comprises a 2 bit packet number along with pairs of subpacketinfo fields 708, 710 and corresponding subpacket length fields 709, 711. Accordingly, OFDMA techniques according to the present invention are employed to increase capacity in the presence of interference in a DO system via this layer based preamble structure 700.

Figure 8:
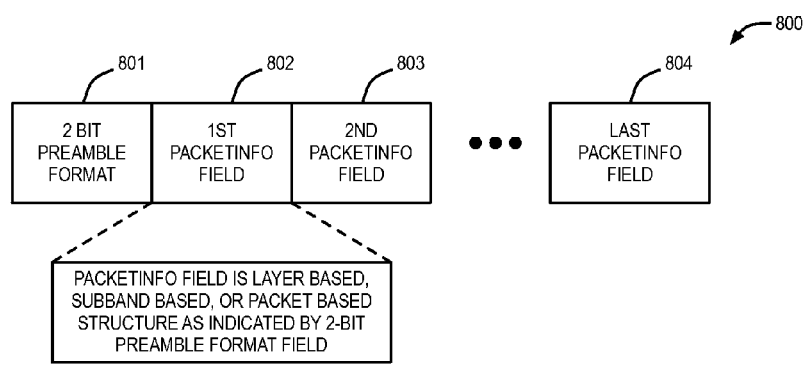
FIG. 8 is a block diagram highlighting an adaptive preamble format structure according to the present invention.

FIG. 8 shows an adaptive preamble structure 800 that utilizes either packet based, subband based, or layer based preambles substantially similar to those embodiments discussed with reference to FIGS. 5-7. In this adaptive embodiment, a two-bit preamble format field 801 is coupled to one or more packetinfo fields 802, 803, 804. The type of preamble structure (i.e., packet based, subband based, or layer based) is indicated by the value of the 2-bit preamble format field 801. Accordingly, OFDMA techniques according to the present invention are employed to increase capacity in the presence of interference in a DO system via this adaptive based preamble structure 800 on a packet-by-packet basis.

According to the embodiments of FIGS. 5-8, a DO OFDMA preamble according to the present invention ranges in size from 10 to 52 bits, which are embedded in an initial transmission of packets to an AT. In addition to the MAC ID, the rate indicator fields 513, 606, 706 indicate an adjusted data rate related to DRC feedback received from the AT, thus reducing the burden on the AT to perform multiple decodings, yet allowing the AN to override the DRC feedback received. The optional 2-bit subband size field 601 indicates how many subbands the 1.2288 MHz carrier is divided into. Thus, when a multiuser packet is transmitted, the subband size field 601 is included.

The combination of an 8-bit MAC ID field 508 and 2-bit rate indicator field 509 is only required when multiple subbands are provided. They are not necessary when a single 1.2288 MHz subband is employed.

The value of the subband size field 601 indicates the number of subbands employed.

In all embodiments, the preamble 500, 600, 700, 800 is transmitted on 32 to 176 OFDM tones, spread across the first half slot and the whole bandwidth.

In one embodiment relating to statistically allocating subbands contemplates a fixed subband allocation per AN were allocation is broadcast publicly in the SectorParameter message.

Figure 9:
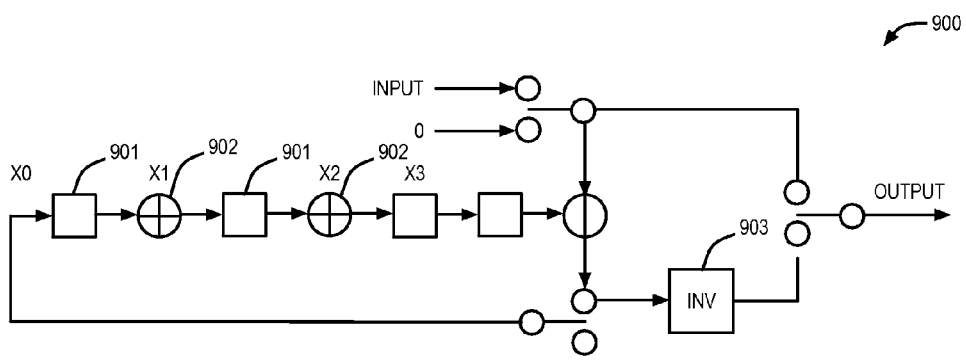
FIG. 9 is a block diagram showing one embodiment of a tail-biting convolutional encoder 900 according to the present invention.

FIG. 9 shows one embodiment of a tail-biting convolutional encoder 900 according to the present invention. The encoder 900 includes a number of memory registers 901, modulo 2 adders 902, and an inverter 903 configured as shown to generate a coded OFDMA preamble. As discussed with reference to FIG. 4, the first 8-bit MAC ID is encoded via a Reed-Solomon encoder, but the remaining fields of the preamble are encoded via a tail-biting convolutional code with inverted CRC bits. As FIG. 4 also shows, the encoded symbols are scrambled, BPSK modulated, and mapped to the 32-176 OFDM tones. If a multiuser packet is to be transmitted the repetition number is equal to two. Otherwise, the repetition number is set to four. Power gains for the preamble, pilot, and traffic are individually configurable. It is noted that the additional coding gain is designed to decrease the false alarm rate and detection missing rate.

Figure 10:
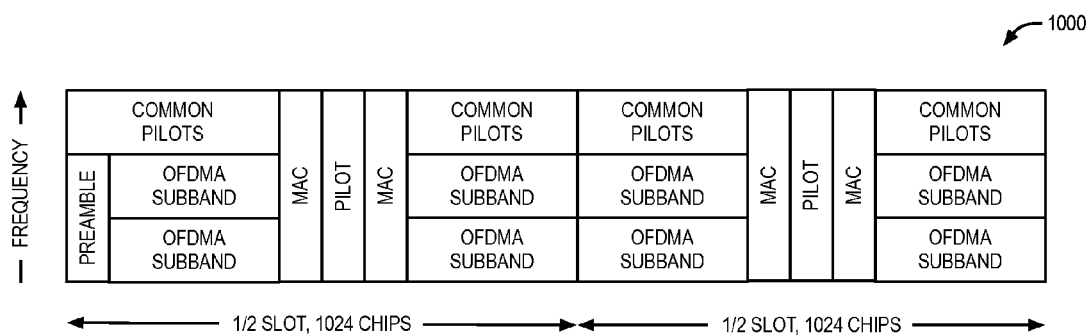
FIG. 10 is a block diagram featuring an exemplary OFDM slot structure according to the present invention.

Referring to FIG. 10, a block diagram is presented featuring an exemplary OFDM slot structure 1000 according to the present invention. The structure 1000 shows that each ½ slot in the transmission comprises common pilots and two or more OFDMA subbands, as discussed above. The first ½ slot also includes a preamble according to the present invention in one of the configurations described with reference to FIGS. 5-8. In addition, existing MAC and pilot fields are transmitted. Accordingly, a multiuser packet places subpackets of multiple ATs into different subbands with an upper limit of four subbands as small as 0.3096 MHz each per 1.2288 MHz carrier. Higher spectral efficiency is achieved by differentiating subband transmission power.

Optionally, layered modulation may be used for each subband. The mechanism according to the present invention allows for flexible and more efficient OFDMA multiuser packet scheduling. Inter-cell interference management is more favorable according to the present invention over existing transmission techniques and ATs on cell edges are additionally supported, particularly those in bad reception conditions or those with delay sensitive services.

OFDMA apparatus and methods according to the present invention are fully compatible with conventional OFDM DO through the use of C/I sensitive DRC reporting as will be described below which is accomplished when an AT reports DRCs for each subband only when the C/I is low and subband channel variation is large. Otherwise, a single DRC is reported. In addition, compatibility is maintained via the adaptive OFDMA preamble discussed with reference to FIG. 8 where only the most efficient OFDMA preamble structure is used by an AN, which is dependent on the employed OFDMA packing method.

Now referring to FIG. 11, a diagram is presented illustrating a SectorParameter message 1100 according to the present invention. As one skilled in the art will appreciate, the SectorParameter message 1100 according to the present invention is a modified version of that employed by the existing EV-DO protocol. Accordingly, the differences lie in how subbands are allocated for OFDMA. One contemplated approach provides for dynamic allocation of subbands and an alternative approach comprehends static allocation of subbands. Both approaches indicate subband allocation via this message 1100.

As noted above, the optional 2-bit subband size field is employed to perform dynamic allocation, where the value of the subband size field indicates how many subbands the 1.2288 MHz carrier is divided into. Transmission of this field is required when provided for transmission of a multiuser packet. For static subband allocation, signaling of the subband structure is indicated by the SectorParameter message 1100 as will be described in further detail below. For alternative embodiments contemplating an anchor subband for each AN, the fixing of each anchor subband per AN is accomplished through the SectorParameter message 1100. As noted above, the anchor subband is a subband that is predefined for transmission of preamble information.

In operation, the SectorParameter message 1100 is employed to convey sector specific information to ATs. Modifications to the existing SectorParameter messages include a subband mask that comprises ChannelSubbandMask, NeighborChannelSubbandMask, and ExtendedChannelSubbandMask fields, which indicate the subband configurations for the channels in the current AN or neighbor ANs. The subband configuration indicates how many subbands are in each 1.2288 MHz channel and what the bandwidth is of each of the subbands therein.

For an anchor subband embodiment, there is an anchor subband for every 1.2288 MHz carrier in each AN, thus allowing every AT served by a particular AN to decode the transmitted packet, which contains the fields shown in the SectorParameter message 1100.

Turning now to FIG. 12, a diagram 1200 is presented showing a format according to the present invention of a forward traffic channel multi-user MAC layer packet 1201 for the anchor subband. The multi-user MAC layer packet 1201 includes a non-anchor subbands packetinfo field, non-anchor subbands layers length field, a layer 1 $1^{st}$-$N^{th}$ 1N packetinfo and length fields, an optional MACheader delimeter field, a non-anchor subbands MACheader field 1202, a MAC layer payload, an optional pad field, and a MAC layer trailer field. The non-anchor subbands MACheader field 1202 includes up to M non-anchor packetinfo fields, length fields, and packet subband allocation fields. A non-anchor Mth MAC layer payload 1203 includes a non-anchor Mth MAC layer payload field along with an optional pad field and a MAC layer trailer.

Figure 13:
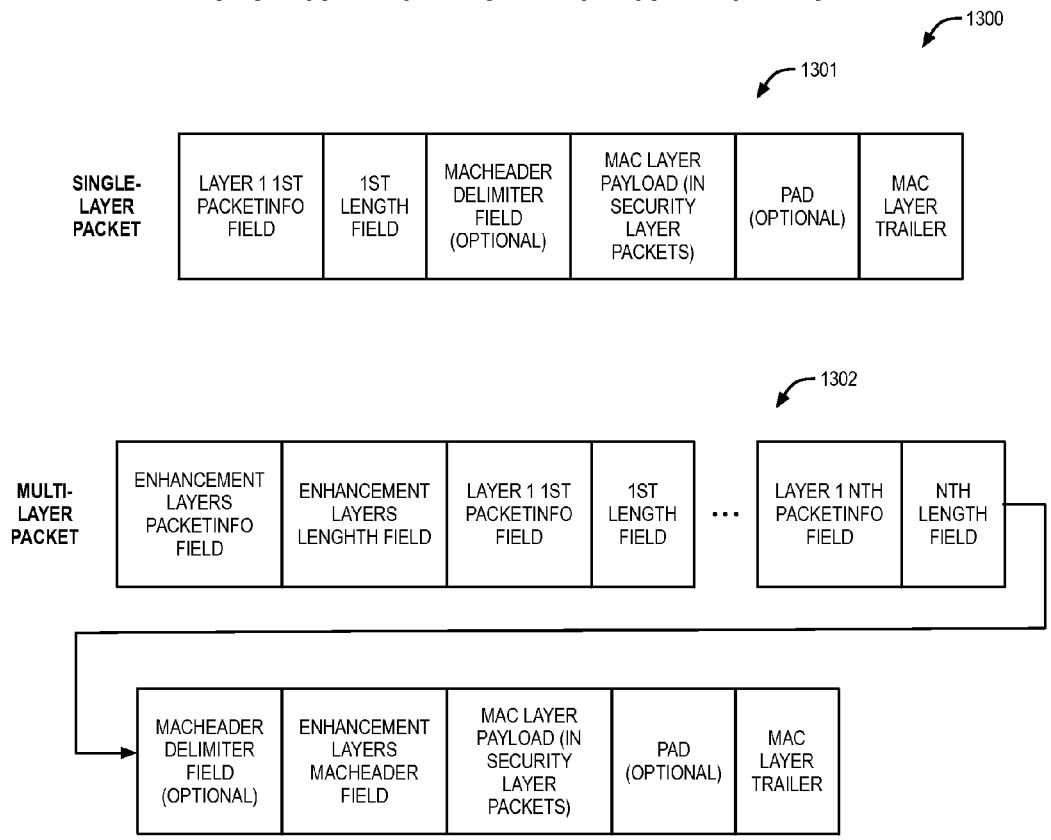
FIG. 13 is a diagram featuring single-user packeting and multiuser packeting according to the present invention.

Now referring to FIG. 13, a diagram 1300 is presented featuring a single-user packeting and multiuser packeting according to the present invention. The diagram 1300 includes a single-layer packet 1301 and a multi-layer packet 1302. The single-layer packet has a layer-1 $1^{st}$ packetinfo field, a $1^{st}$ length field, an optional MACheader delimeter field, a MAC layer payload, an optional pad field, and a MAC layer trailer. The multi-layer packet 1302 includes an enhancement layers packetinfo field, an enhancement layers length field, up to n layer-1 packet info fields and length fields, an optional MACheaderdelimeter field, an enhancement layers MACheader field, a MAC layer payload, an optional pad field, and a MAC layer trailer field.

Figure 14:
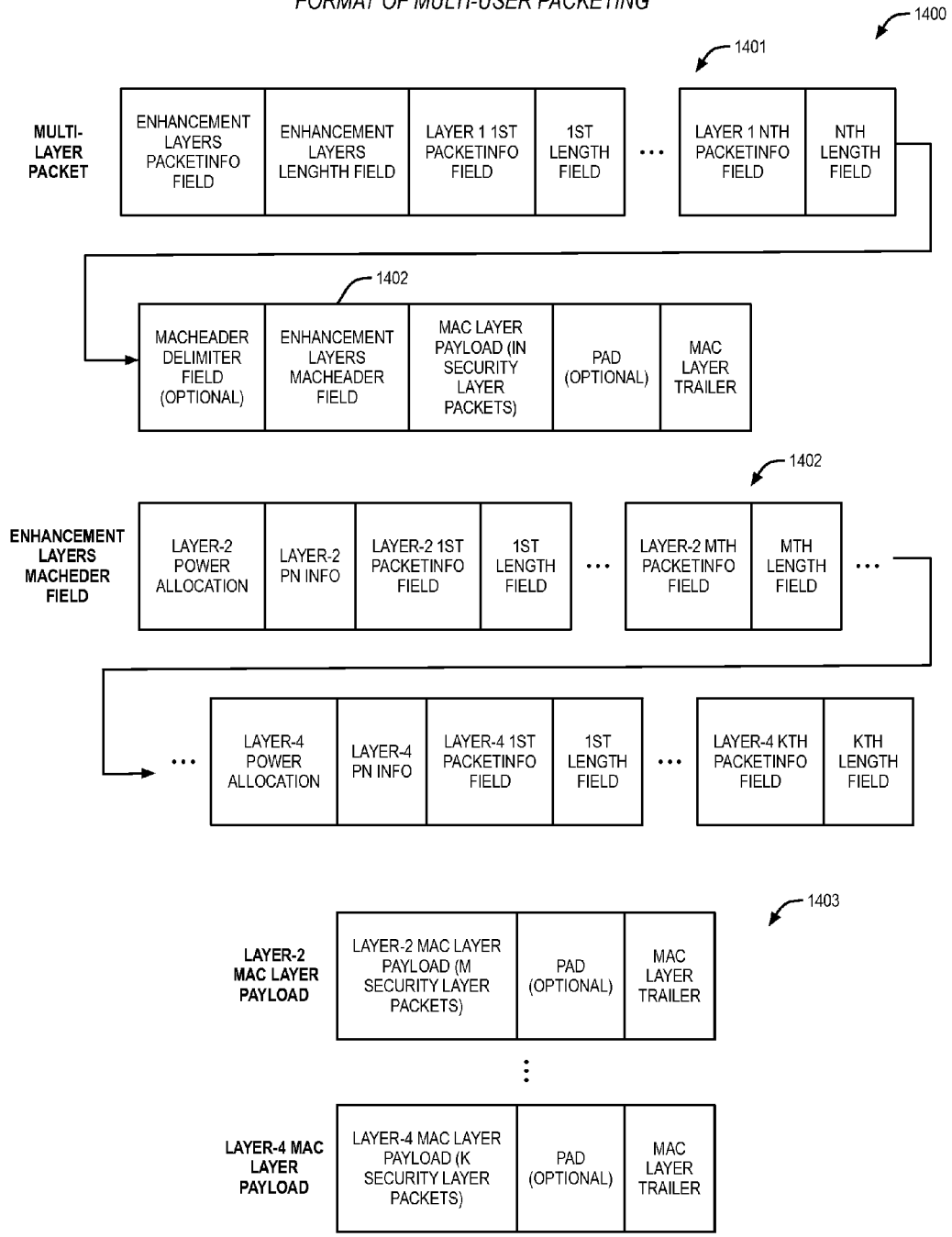
FIG. 14 is a diagram detailing a format of multi-user packeting according to the present invention.

Now referring to FIG. 14, a diagram 1400 is presented illustrating a format of multi-user packeting according to the present invention. The diagram 1400 shows a multi-layer packet 1401, which includes an enhancement layers packetinfo field, an enhancement layers length field, from 1 to N layer 1 packetinfo and length fields, an optional MACheader delimiter field, an enhancement layers MACheader field 1402, a MAC layer payload field, an optional pad field, and a MAC layer trailer field.

The enhancement layers MACheader field 1402 includes a layer-2 power allocation field, a layer-2 PN info field, from 1 to M layer-2 packetinfo and length fields, a layer-3 power allocation field, a layer-3 PN info field, from 1 to J layer-3 packetinfo and length fields, a layer-4 power allocation field, a layer-4 PN info field, and from 1 to K layer-4 packetinfo and length fields. Layer-2 through layer-4 MAC layer payloads 1403 are shown that include a layer-2 MAC layer payload field having M security layer packets, an optional pad field, and a MAC layer trailer. The layer-4 MAC layer payload includes a layer-4 MAC layer payload field having K security layer packets, an optional pad field, and a MAC layer trailer.

It is noted that the MAC head of non-anchor subband packets is embedded as one MAC layer payload and the subband allocation for each non-anchor packet is also indicated in the anchor subband's non-anchor subbands MAC-header field.

Turning now to FIG. 15, a diagram is presented showing a modified routeupdate message 1500 according to the present invention. The message 1500 has a messageid field, a messagesequence field, a refrerencepilotph field, a referencepilotstrength field, a referencekeepfield, a numpilots field, and a reserved field. The message 1500 also includes numpilots occurrences of the following fields: pilotphase, channelincluded, channel, pilotstrength, keep, and subbandc2istrengthorder. The subbandsc2istrengthorder field is the parameter that enables an AT to inform the AN of the C/I strength per subband. An AT uses this field to inform the AN which subband is preferred for subband handoff.

As noted above, those in the art know well that there exists a ping-pong problem when an AT performs a handoff between two ANs in the same carrier. Because of channel fading, the pilot strength of the source AN and destination AN may change frequently in some cases. Additionally, there is few ping-pong problem when an AT performs handoff between different carriers, and thus it is required for the AT to consistently monitor multiple carriers. Accordingly, the present invention provides for fast handoff between subbands, which effectively mitigates the ping-pong problem without additional signal measurements on different carriers.

Figure 16:
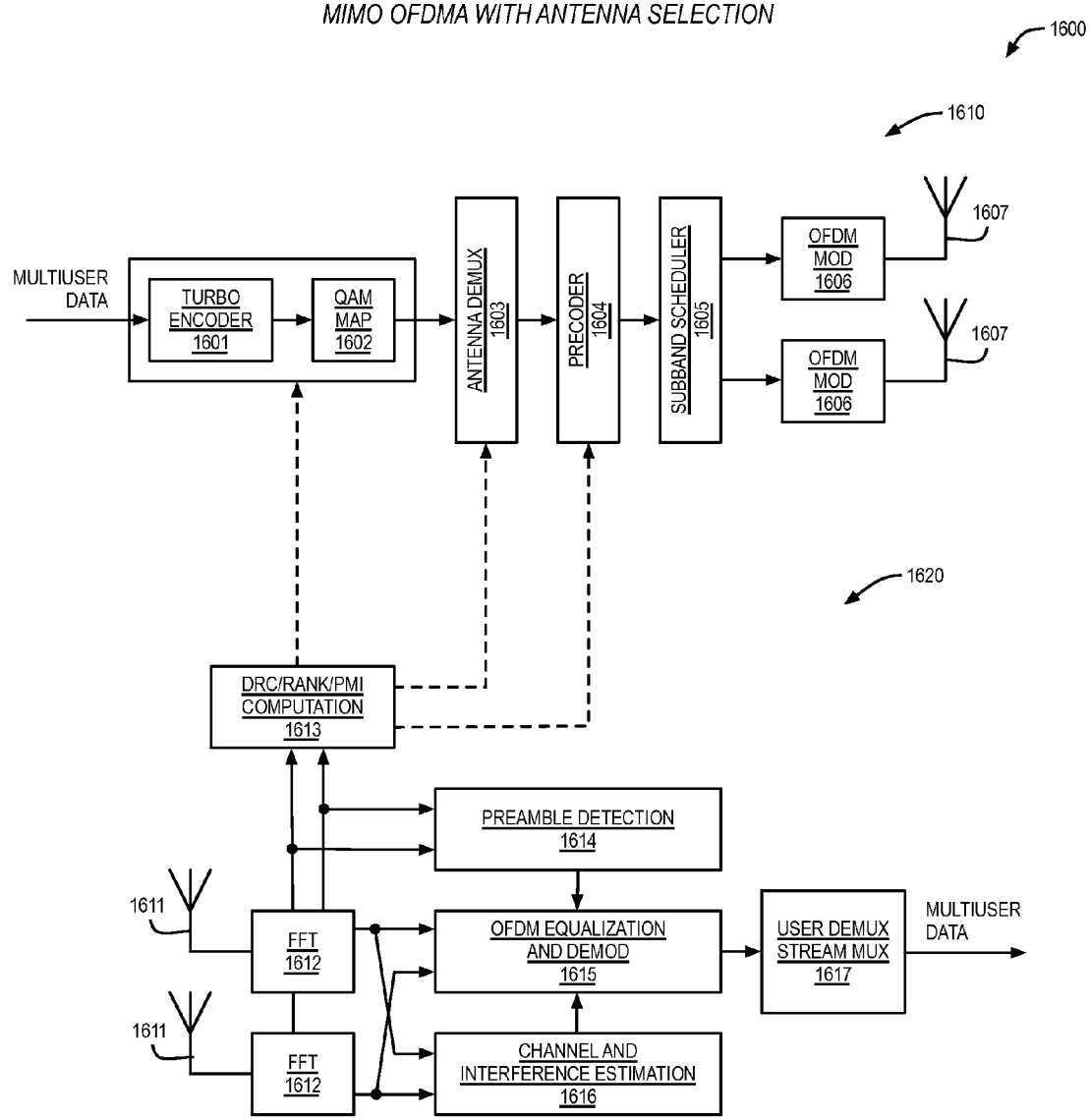
FIG. 16 is a block diagram highlighting an apparatus according to the present invention for performing antenna or antenna stream selection.

Now referring to FIG. 16, a block diagram is presented showing an apparatus 1600 according to the present invention for performing antenna or antenna stream selection. The apparatus 1600 includes an AN 1610 and an AT 1620 wirelessly coupled together.

To improve the performance of existing DO network infrastructures in a cost efficient manner, the present inventors note that receiver antenna selection is the most cost efficient multi-antenna technique to asymptotically achieve the full potential of MIMO because it requires fewer radio frequency chains, it places less constraints on phone design, and it exhibits both lower power and lower manufacturing cost over those techniques heretofore provided. In addition, the The achievable spectral efficiency is close to those techniques having full radio frequency chains, if the following techniques are adopted:

Antenna Selection: the AT 1620 chooses some antennas for the next receive/transmit;

Beam Selection: the AT 1620 selects the best beams and feeds back the preamble message indicators (PMIs); and Subband Selection: the AT 1620 calculates PMIs for each of the subbands and reports back the best several PMIs the AN 1610.

The AN 1601 has multiuser data that is input to a turbo encoder 1601, the output of which is passed to an OFDM map element 1602. The output of the OFDM map element 1602 is provides to an antenna demux element 1603, which provides an output received by a precoder 1604. The output of the precoder 1604 is provided to a subband scheduler 1605, which is coupled to up to four OFDM modulators 1606. For clarity, only two modulators 1606 are depicted. Each of the OFDM modulators 1606 are coupled to a respective antenna 1607.

The AT 1602 receives/transmits signals via up to four antennas 1611, two of which are shown for clarity sake. Each of the antennas 1611 is coupled to a respective Fast Fourier Transform (FFT) element 1612, all of which are coupled to a digital rate control (DRC)/Rank/PMI computation element 1613, a preamble detector 1614, an OFDM equalization and demodulation element 1615, and a channel and interference estimation element 1616. The preamble detector 1614 is coupled to the OFDM equalization and demodulation element 1615, which is coupled to the channel and interference estimation element 1616. The OFDM equalization and demodulation element 1615 is also coupled to a user demux stream mux element 1617, which outputs multiuser data destined for the AT. The DRC/Rank/PMI computation element 1613 generates those feedback indicators discussed above which are used by the AN 1610 to determine optimum selection of subbands and antennas to effectively communicate with the AT 1620.

In operation, the 1.2288 MHz carrier is split into up to four subbands. For an AT 1620 selecting a single receive antenna 1611, the 1.2288 MHz band is divided into four even subbands, each of bandwidth 0.3072 MHz. For an AT 1620 selecting two or more receive antennas 1611, the 1.2288 MHz band is divided into two even subbands of bandwidth 0.6144 MHz each.

Depending on how much feedback the AT 1620 reports, it is necessary to obtain a balance between spatial processing gain and frequency selectivity gain. For an AT 1620 selecting fewer antennas 1620/beams and reporting more subbands, potentially there will be more frequency domain scheduling gain. For ATs 1620 selecting more beams and fewer subbands, there will be more spatial processing gain.

Figure 17:
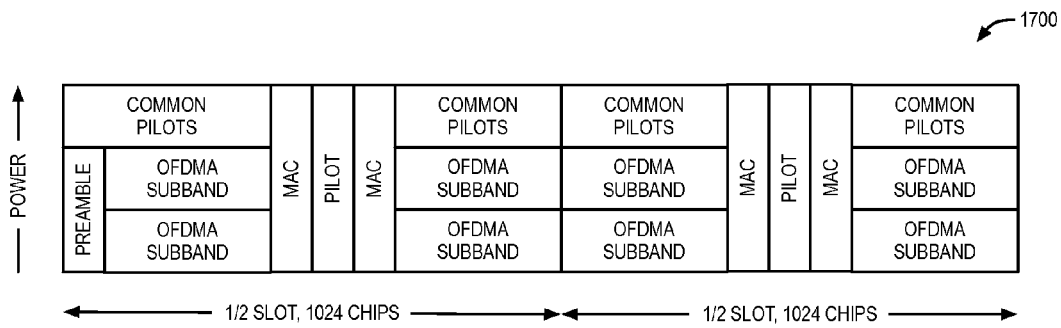
FIG. 17 is a diagram featuring an exemplary OFDM slot structure according to the present invention for subband MIMO-OFDMA.

Turning to FIG. 17, a diagram is presented featuring an exemplary OFDM slot structure 1700 according to the present invention for subband MIMO-OFDMA. The structure 1700 shows that each ½ slot in the transmission comprises common pilots and two or more OFDMA subbands, as discussed above. The first ½ slot also includes a preamble according to the present invention in one of the configurations described with reference to FIGS. 5-8. In addition, existing MAC and pilot fields are transmitted. Accordingly, a multiuser packet places subpackets of multiple ATs into different subbands with an upper limit of four subbands as small as 0.3096 MHz each per 1.2288 MHz carrier. The slot structure 1700 according to the embodiment of FIG. 17 differs from that structure 1000 of FIG. 10 in that subband transmission power is differentiated, thus providing for higher spectral efficiency over the embodiment of FIG. 10.

Accordingly, each AT reports DRC for each subband, even in single-antenna or single code word (SCW) mode. For a single-antenna AT embodiment, the single-antenna AT reports DRC/PMI for each of the four subbands. For a dual-antenna AT embodiment, the dual-antenna AT reports two DRC/PMI for each of two subbands. Four bits indicate the data rate request and 3 bits indicate the desired serving sector. The channel itself has 64-ary bi-orthogonal modulation.

In one embodiment, reverse link DRC (R-DRC) is sent on the Walsh codes W(8,32) and W(24,32) and is multiplexed on the in-phase (I) and quadrature (Q) branches, which is similar to the DRC report in multiple code word (MCW) mode.

It is noted that the present invention provides for enhancements related to VoIP as well. Thus, considerations for delay sensitive services such as VoIP must be taken into account. CDM DO was originally designed and optimized for high throughput, multiuser diversity scheduling, and slow power control with early termination. Yet, delay sensitive services have different requirements on system optimization because the key requirement is delay itself, followed by requirements for throughput and/or user capacity. Consequently, the users in bad reception conditions expect more transmit power while the users in good reception condition may need less transmit power. In addition, many delay sensitive services do not demand high throughput.

Accordingly, the throughput for delay sensitive services is usually optimized with delay-limited capacity instead of multiuser diversity. Thus, the considerations for optimizing delay sensitive services include channel sensitive scheduling in both time and frequency domains, which involves optimizing the channel/user assignment for saving transmission power and minimizing interference. Other considerations involve dynamic forward power allocation in the frequency domain, reverse power control, and early termination.

Regarding capacity, the OFDMA techniques according to the present invention, provide several advantages over conventional CDM DO. One such advantage is that OFDMA provides for potential gain of frequency selectivity, especially when it is combined with multiuser scheduling. In addition, for both water-filing and delay-limited single-user capacities, it is well-known that At low signal-to-noise ratio (SNR), the capacity with full channel quality indicator (CQI) is significantly larger than the capacity with no CQI feedback and at high SNR, the difference between the two becomes small. Additionally, from a multiuser scheduling perspective, one challenge is the balance between maintaining fairness for weak-channel users and maximizing throughput through strong-channel users. Consequently, the full CQI feedback for weak-channel users can help the AN with the efficient multiuser scheduling for delay sensitive services.

Regarding DRC reporting according to the present invention, this is the very mechanism to help an AN with multiuser scheduling. Typically a 4-bit DRC value is bi-orthogonally coded, and DRC measurements can be obtained through both CDM time-domain pilots and OFDM frequency-domain pilots. The general C/I can be obtained from CDM pilots, and the frequency selectivity can be observed through frequency-domain pilots.

DRC reporting can be optimized to reduce the feedback overhead for OFDMA. In one aspect, frequency selectivity gain is visible only when there is significant difference between subchannel gains. When an AT sees the subchannel gains are relatively flat or when C/I ratios are relatively high, the AT may just report one DRC for all subchannels. When an AT detects the variation of subbchannel gains is large and C/I ratio is not high, it may report multiple DRCs instead.

Regarding subband hopping, for ATs inside a cell or with acceptable C/I, subband DRC reporting is optional. If a high-DRC AT only feeds back a single DRC for all subbands, one option is enables the packets for high DRC to generally be transmitted through the whole 1.2288 MHz bandwidth or all subbands. Alternatively, the packets for high DRC can also be transmitted through one subband or multiple subbands. The subband(s) allocated for the high DRC packet are not fixed. A predefined subband hopping may be applied. If a high-DRC AT feedbacks multiple subband DRCs with significant variation, the AN may schedule the AT in good subband(s) with no subband hopping.

Figure 18:
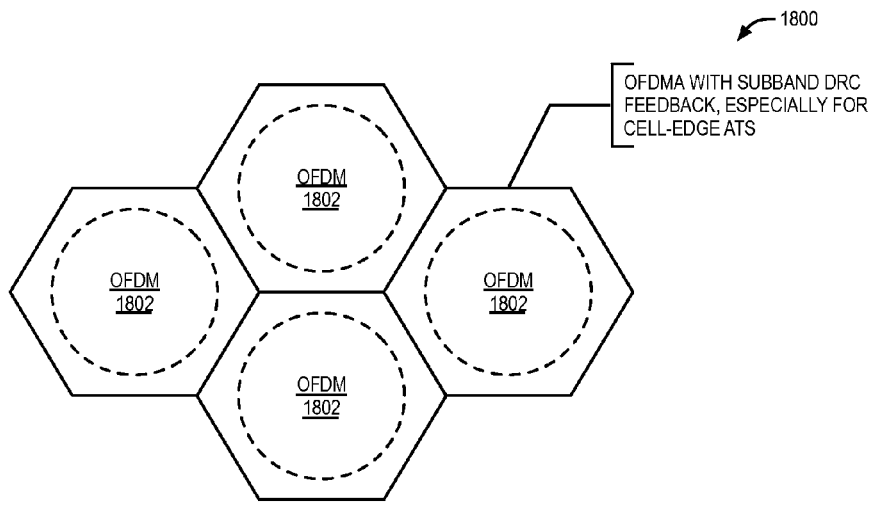
FIG. 18 is a block diagram illustrating deployment of OFDMA and OFDM according to the present invention.

Turning to FIG. 18, a diagram 1800 is presented illustrating deployment of OFDMA and OFDM according to the present invention. The diagram 1800 shows a plurality of OFDM cells 1802, each providing for subband DRC feedback, especially for cell edge ATs.

As one skilled in the art will appreciate, CDMA2000 1X is well-known to be interference limited, especially on cell edges due to pilot interference, overhead channel interference and traffic channel interference. And it is noted that the present invention provides multiple mechanisms to improve cell-edge performance, which include interference management of power control and frequency reuse. This is achieved by employing OFDMA with power management techniques as discussed above. In addition, cooperation between neighbor ANs provides for macro-diversity through use of simple broadcast multicast. In considering AN cooperation, it is known that soft combine has the advantage of simple receiver design and the potential of 3 dB SNR gain. Additionally, soft combine puts more scheduling constraints on the ANs. Yet, for OFDMA a single traffic pattern is required to be shared between participating ANs.

Figure 19:
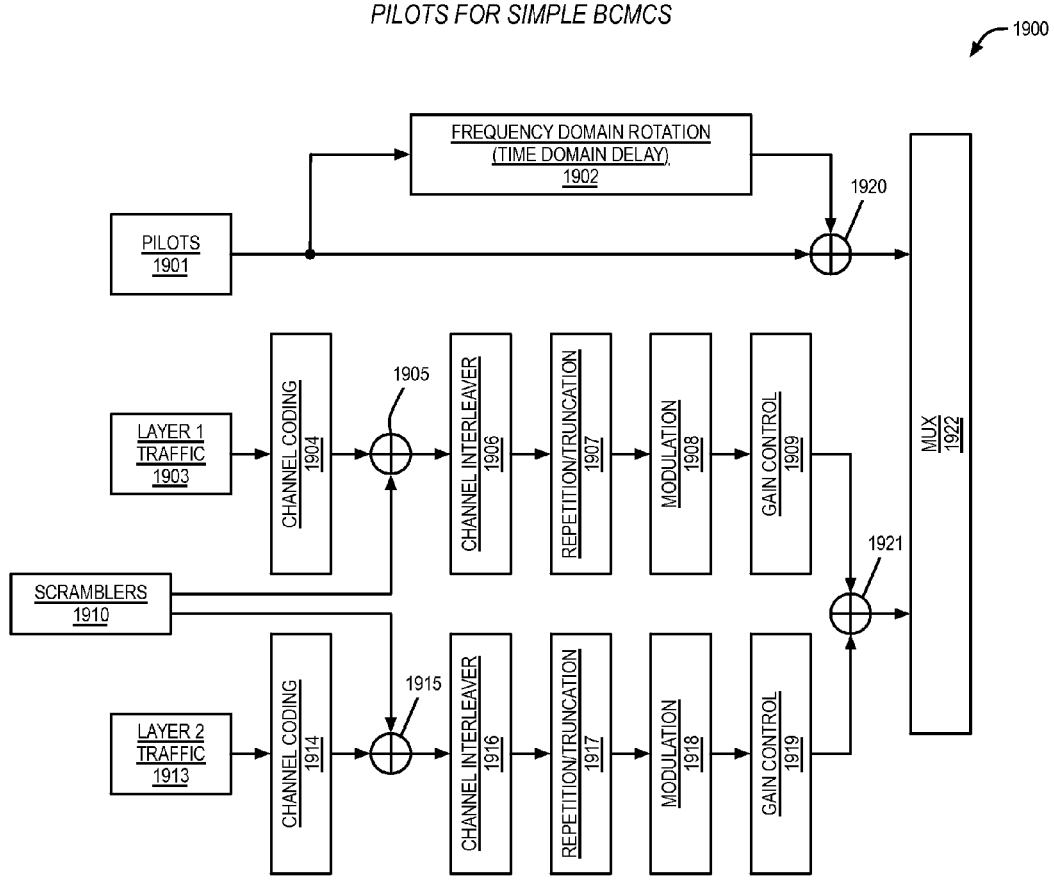
FIG. 19 is a block diagram showing an apparatus for generating pilots for simple broadcast multicast services (BC-MCS) according to the present invention.

Referring now to FIG. 19, a block diagram is presented showing an apparatus 1900 for generating pilots for simple broadcast multicast services (BCMCS) according to the present invention. The apparatus 1900 shows pilots 1901, layer 1 traffic 1903, and layer 2 traffic 1913. The pilots 1901 are received by a frequency domain rotation (time domain delay) element 1902, whose output is added to the unrotated version of the pilots via a modulo-2 adder 1920. The layer 1 traffic 1903 is provided to a channel coding element 1904, whose output is added via an modulo-2 adder 1905 to output of a scramblers element 1910. Output of the adder 1905 is provided to a channel interleaver element 1906. The output of the interleaver 1906 is input to a repetition/truncation element 1907, whose output is directed to modulation element 1908. Output of the modulation element 1908 is provided to a gain control element 1909.

In like manner, layer 2 traffic is provided to a channel coding element 1914, whose output is added via a modulo-2 adder 1915 to output of the scramblers element 1910. Output of the adder 1915 is provided to a channel interleaver element 1916. The output of the interleaver 1916 is input to a repetition/truncation element 1917, whose output is directed to modulation element 1918. Output of the modulation element 1918 is provided to a gain control element 1919. The outputs of the gain control elements 1909, 1919 are added together by an adder 1921. The outputs of the adders 1920, 1921 are provided to a mux 1922.

Operationally, simple BCMCS physical layer features include that more than one sector can transmit the same signal streams with the same content at the same time and frequency. For alleviating the scheduling constraints, the multicast signal stream can be transmitted through multiuser packets and layered transmission. Accordingly, the pilots for separately the channel estimation of each layer are superimposed together with special rotations. In one embodiment, only one multiuser packet MAC ID is especially reserved with multicast capability.

At the MAC layer, an AT is assigned a unicast MAC ID and a multicast MAC ID from each sector in its active set. Multicast MAC ID assignment optional. Mulitcast MAC IDs are assigned independently by each sector in the active set. They are assigned if MAC ID's are available and for relatively large numbers of users within a multicast zone to improve physical layer efficiency. This is the same as MAC ID assignment for ATs in soft/softer handoff and presents no changes to MAC packet construction. The AN serves multicast packets using multicast MAC ID via multiuser packets where they are transmitted at the lowest data rate that can be supported by all users to whom the multicast packet is addressed. At the connection layer, the AN may assign multicast MAC addresses via traffic channel assignment (TCA).

For the soft combining simple BCMCS data from different sectors, the sector-specific overhead transmission is separated from the data transmission. The data can be transmitted from a separated layer, which has layer-specific pilots.

Regarding location services, the positioning approaches for CDMA2000 location services include Cell-Id, enhanced forward link trilateration (EFLT), advanced forward link trilateration (AFLT) and advance global positioning system (A-GPS). Location services are enabled through IS-801 messages. Though periodic location updating is well-known to be beneficial to both network management and location based services, the overhead may be non-trivial. Hence simplifying positioning assistance overhead is one consideration in improving location services. Thus, it is noted that the present invention provides for periodic GPS assistance service through simple broadcast and multicast service. GPS enabled ATs can subscribe to periodic GPS assistance service provided by capable ANs. Accordingly, a multicast MAC ID is assigned to this service. Some GPS assistance data is periodically and simultaneously broadcast through multiuser packets from the ANs, in addition to some necessary unicasts, and the ATs can periodically updated its local GPS data repository when necessary.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. An access node wirelessly coupled to a plurality of access terminals, comprising:
    an encoder configured to generate a preamble signal corresponding with a plurality of data streams;
    a plurality of multiplexers, coupled to said encoder and configured to convert said preamble signal and said plurality of data streams into a corresponding preamble tone and a corresponding plurality of subbands, wherein the preamble tone indicates the configuration of the plurality of subbands, and the plurality of subbands comprising a plurality of data packets corresponding with the plurality of access terminals; and
    a transmitter, coupled to said plurality of multiplexers, configured to transmit said corresponding preamble tone and said corresponding plurality of subbands to the plurality of access terminals.

2. The access node as recited in claim 1, wherein when a pilot strength of a first subband is higher than other subbands, the preamble tone is transmitted in said first subband.

3. The access node as recited in claim 1, wherein the preamble signal indicates the configuration based on packet, subband or layer.

4. The access node as recited in claim 3, wherein
    if the configuration is based on packet, the preamble signal comprising a plurality of packet information signals and corresponding length, each of the packet information signals indicates which one or more subbands are designated by the packet;
    if the configuration is based on subband, the preamble signal comprising a plurality of subband information signals and corresponding rate, each of the subband information signals indicates which one or more packets are designated by the subband; and
    if the configuration is based on layer, the preamble signal comprising a plurality of layer information signals, each of the layer information signals indicates which one or more subpackets are designated by the layer.

5. The access node as recited in claim 1, wherein the preamble signal further comprising a rate control index which is updated according to the packet coding/decoding rate.

6. The access node as recited in claim 1, wherein when the plurality of subbands are designated to a plurality of users, the plurality of data packets of MAC layer comprising the plurality of packet information signals corresponding with a plurality of layers and a plurality of delimeters.

7. The access node as recited in claim 1, wherein when the plurality of subbands are designated to a single user and multiple users, the plurality of data packets further comprising a single layer and multiple layers.

8. The access node as recited in claim 1, wherein the transmitter further comprising a plurality of antennas, the plurality of multiplexers divide said signal into the plurality of subbands according to the number of the plurality of antennas.

9. A method for an access node wirelessly coupled to a plurality of access terminals, comprising:
    generating the preamble signal corresponding with a plurality of data stream;
    converting said preamble signal and said plurality of data streams into a corresponding preamble tone and a corresponding plurality of subbands, wherein the preamble tone indicates the configuration of the plurality of subbands, and the plurality of subbands comprising a plurality of data packets corresponding with the plurality of access terminals; and
    transmitting said corresponding preamble tone and said corresponding plurality of subbands to the plurality of access terminals.

10. The method as recited in claim 9, wherein when a pilot strength of a first subband is higher than other subbands, the preamble tone is transmitted in said first subband.

11. The method as recited in claim 9, wherein the preamble single indicates the configuration based on packet, subband or layer.

12. The method as recited in claim 11, wherein
    if the configuration is based on packet, the preamble signal comprising a plurality of packet information signal and corresponding length, each of the packet information indicates which one or more subbands are designated by the packet;
    if the configuration is based on subband, the preamble signal comprising a plurality of subband information signal and corresponding rate, each of the subband information indicates which one or more packets are designated by the subband; and
    if the configuration is based on layer, the preamble signal comprising a plurality of layer information signals, each of the layer information signals indicates which one or more subpackets are designated by the layer.

13. The method as recited in claim 9, wherein the preamble signal further comprising a rate control index which is updated according to the packet coding/decoding rate.

14. The access node as recited in claim 9, wherein when the plurality of subbands are designated to a plurality of users, the plurality of data packets of MAC layer comprising the plurality of packet information signals corresponding with a plurality of layers and a plurality of delimeters.

15. The access node as recited in claim 9, wherein when the plurality of subbands are designated to a single user and multiple users, the plurality of data packets further comprising a single layer and multiple layers.

16. The access node as recited in claim 9, wherein when the plurality of data packets is assigned to the plurality of subbands according to the number of a plurality of antennas.

17. An access terminal wirelessly coupled to one or more access nodes, the access terminal comprising:
- a plurality of antennas, configured to receive a preamble tone and a plurality of data tones which have been transmitted over a plurality of subbands of a code division multiple access carrier frequency;
- a preamble detection element, operatively coupled to said plurality of antennas, configured to determine said plurality of subbands according to said preamble tone, wherein said plurality of subbands comprise one or more corresponding data streams for reception by the access terminal; and
- a multiplex equalization and demodulation element, coupled to said preamble detection element, configured to convert said one or more of said plurality of subbands into said one or more corresponding data streams.

18. The access terminal as recited in claim 17, wherein said preamble tone comprises a packet based preamble, a subband based preamble or a layer based preamble.

19. The access terminal as recited in claim 17, wherein the access terminal measures the strength of the plurality of subbands and transmits a plurality of data rate control signals one or more of the plurality of access nodes, and wherein the one or more of the plurality of access nodes map subsequent transmissions to the access terminal over said plurality of subbands according to said plurality of data rate control signals.

* * * * *